United States Patent Office 2,760,977
Patented Aug. 28, 1956

2,760,977
N-ALKYLOL UNSATURATED AMIDES

Henry Feuer, West Lafayette, Ind., and Una Lynch Hart, Belleville, N. J., assignors, by mesne assignments, to Research Corporation, New York, N. Y., a corporation of New York No Drawing. Application June 3, 1953,
Serial No. 359,434

4 Claims. (Cl. 260—561)

This invention relates to the preparation of N-alkylol amides and is more particularly concerned with the preparation of N-alkylol amides of unsaturated acids, by condensation with appropriate aldehydes under controled conditions.

A principal object of the present invention is the preparation of novel aliphatic unsaturated N-alkylol amide monomers. A further object of the present invention is to prepare well-defined crystalline compounds, containing an N-alkylol structure and an unsaturated linkage, useful in the preparation of polymers. Still a further object of the present invention is the preparation of N-alkylol amides useful in the synthesis of more complex organic compounds. Another object of the present invention is the provision of a process for the preparation of compounds useful in the synthesis of certain oxygen-containing polymers. Other objects will become apparent hereinafter.

It has now been found that an aliphatic unsaturated amide may be reacted with a lower-alkyl aldehyde by contact under anhydrous conditions, in the presence of a basic catalyst, and in a solvent in which the resulting N-alkylol amide is insoluble. Generically, the reaction may be depicted by:

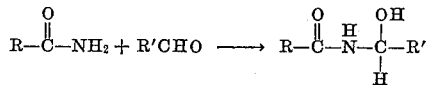

wherein R is an aliphatic α-unsaturated hydrocarbon residue, and wherein R' is hydrogen or a lower-alkyl group. Representative aliphatic α-unsaturated acids which are suitable in the process of the present invention, include, for example, acrylic, α- and β-methacrylic, α- and β-ethylacrylic, α,β-,α,α-, and β,β-dimethylacrylic, α-pentenoic, isohydrosorbic, β-vinylacrylic, sorbic, geranic, dehydrogeranic, citraconic, mesaconic, itaconic, glutaconic, muconic, crocetin, et cetera. Thus, the amide must be aliphatic, containing up to ten carbon atoms, and a double bond adjacent the carbon containing the amide linkage. Representative lower-alkyl aldehydes which are suitable in the process of the present invention include, for example, formaldehyde, acetaldehyde, propanal, butanal, pentanal, hexanal, that is, lower-alkyl aldehydes preferably containing up to six carbon atoms, inclusive. Formaldehyde is preferred. When formaldehyde is employed, the compound per se may be used, or a source thereof, such as paraformaldehyde, trioxane, et cetera is satisfactory.

It is essential that the process be conducted in the substantial absence of water, or water vapor, that is, under substantially anhydrous conditions. A basic catalyst is also required, representative basic materials which are suitable, include, for example, sodium, sodium, hydroxide, potassium, calcium, ruthenium, sodium amide, potassium hydroxide, sodium and potassium alkoxides, such as sodium ethoxide, potassium propoxide, et cetera, that is, a compound which is sufficiently basic in nature to cause the reaction to proceed. Another essential condition of the reaction is the use of a solvent in which the N-alkylol reaction product is insoluble. Since the reaction is reversible, the separation of the reaction product as formed will cause completion thereof. Representative solvents which are suitable include, for example, carbon tetrachloride, ethylene chloride, trichloroethylene, ethyl acetate, ether, petroleum ether, chloroform, et cetera. It is also desirable that the starting amide and aldehyde be soluble in the solvent selected. Equimolecular quantities of the reactants are preferably employed, however, an excess of either reactant apparently does not affect the reaction.

The reaction will usually occur upon contact of the reactants, however, to insure complete reaction, it may be desirable to heat the mixture to a temperature above about thirty degrees centigrade and below that temperature at which decomposition of the organic materials occurs. Preferably, temperatures between about forty and ninety degrees centigrade are employed. Reaction time will vary, depending upon temperature, particular reactants employed, catalyst, degree of completeness desired, et cetera, but usually will not exceed twenty-four hours.

The N-alkylol amides prepared by the process of the present invention are usually crystalline solids which are decomposed slowly in the presence of water. They may be easily polymerized or copolymerized in the presence of a suitable catalyst, for example, methyl amyl peroxide.

The following examples are given to illustrate this invention further, but are not to be construed as limiting.

Example 1.—N-methylolmethacrylamide

A mixture of 42.5 grams (0.5 mole) of methacrylamide, fifteen grams (0.5 mole) of paraformaldehyde and 600 milliliters of dry carbon tetrachloride were placed in a three-necked flask equipped with a stirrer, a thermometer, and a calcium chloride drying tube. To this mixture was added two milliliters of a mixture of colloidal sodium in xylene and the resulting admixture heated at 50–52 degrees centigrade for one-half hour, during which time an oil formed. The hot solution was filtered through a coarse sintered glass funnel to remove any inorganic material. The filtrate was cooled in an ice bath, and upon scratching the sides of the container with a glass rod, the solid formed. There was thus obtained 46.7 grams (83 percent of the theoretical yield) of N-methylolmethacrylamide, a crystalline product which, upon recrystallization twice from warm ethyl acetate, yielded needles, having a melting point of 53.5–54 degrees centigrade.

Analysis:
  Calculated for $C_5H_9O_2N$: C, 52.20; H, 7.83; N, 12.18
  Found:                       52.35;    7.76;    12.41

Example 2.—N-methylolacrylamide

In a manner similar to that of Example 1, 35.5 grams (0.5 mole) of acrylamide and fifteen grams (0.5 mole) of paraformaldehyde were treated in 300 milliliters of dry ethylene chloride, with the addition of colloidal sodium in xylene. There was obtained 52 grams (87 percent of the theoretical yield) of N-methylolacrylamide, having a melting point of 74–75 degrees centigrade.

Analysis:
  Calculated for $C_4H_7NO_2$: C, 47.55; H, 6.93; N, 13.87
  Found:                       47.47;    6.84;    13.91

Example 3

In a manner similar to that of the above examples, acetaldehyde may be reacted with ethylacrylamide to prepare N-ethylolethylacrylamide, propanol may be reacted with propylacrylamide to prepare N-propanolpropylacrylamide, isohexanal may be reacted with butylacrylamide to prepare N-isohexylolbutylacrylamide, acetaldehyde may be reacted with methacrylamide to prepare N-ethylolmethacrylamide, et cetera.

Various modifications may be made in the method of the present invention without departing from the spirit or scope thereof, and it is to be understood that we limit ourselves only as defined by the appended claims.

We claim:

1. The process which comprises: contacting, at a temperature between 30 and 90 degrees centigrade, and under anhydrous conditions, substantially equimolecular quantities of an N-unsubstituted alpha-alkenamide containing up to 10 carbon atoms and a lower-alkyl aldehyde containing up to six carbon atoms, the reaction being conducted in the presence of an organic solvent selected from the group consisting of carbon tetrachloride, ethylene chloride, trichloroethylene, ethyl acetate, ether, petroleum ether, chloroform, and in the presence of a basic catalyst selected from the group consisting of sodium, sodium hydroxide, potassium, calcium, ruthenium, sodium amide, potassium hydroxide, sodium and potassium alkoxide; and, recovering a substantially monomeric N-alkylol unsaturated amide.

2. The process which comprises: contacting, at a temperature between 30 and 90 degrees centigrade, and under anhydrous conditions, substantially equimolecular quantities of an N-unsubstituted alpha-alkenamide containing up to 10 carbon atoms and a lower-alkyl aldehyde containing up to six carbon atoms, the reaction being conducted in the presence of carbon tetrachloride and colloidal sodium; and recovering a substantially monomeric N-alkylol unsaturated amide.

3. The process which comprises: contacting acrylamide with formaldehyde in the presence of colloidal sodium, ethylene chloride, anhydrous conditions, at a temperature between 30 and 90 degrees centigrade, and recovering N-methylolacrylamide thus formed.

4. The process which comprises: contacting methacrylamide with formaldehyde in the presence of colloidal sodium carbon tetrachloride, anhydrous conditions, at a temperature between 30 and 90 degrees centigrade, and recovering the N-methylolmethacrylamide thus formed.

References Cited in the file of this patent

UNITED STATES PATENTS

| | | |
|---|---|---|
| 2,132,671 | Bauer | Oct. 11, 1938 |
| 2,279,497 | Sallmann | Apr. 14, 1942 |
| 2,290,675 | D'Alelio | July 21, 1942 |